(12) United States Patent
Linietsky et al.

(10) Patent No.: US 11,200,598 B2
(45) Date of Patent: Dec. 14, 2021

(54) LINKING SEPARATE ANONYMOUS ACTIONS TO A COMMON USER

(71) Applicant: iHeartMedia Management Services, Inc., San Antonio, TX (US)

(72) Inventors: Laurence B. Linietsky, Montclair, NJ (US); Ralph C. Munsen, Mahwah, NJ (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 16/550,424

(22) Filed: Aug. 26, 2019

(65) Prior Publication Data

US 2019/0378168 A1    Dec. 12, 2019

Related U.S. Application Data

(63) Continuation of application No. 12/949,600, filed on Nov. 18, 2010, now abandoned.

(60) Provisional application No. 61/262,517, filed on Nov. 18, 2009.

(51) Int. Cl.
*G06Q 30/02* (2012.01)

(52) U.S. Cl.
CPC ..... *G06Q 30/0255* (2013.01); *G06Q 30/0269* (2013.01)

(58) Field of Classification Search
CPC .................................................. G06Q 30/02
USPC .......................... 705/14.49, 14.53; 370/352
See application file for complete search history.

(56) References Cited

U.S. PATENT DOCUMENTS

| 2008/0259906 A1* | 10/2008 | Shkedi .......................... 370/352 |
| 2010/0211464 A1* | 8/2010 | Zhu et al. .................. 705/14.53 |
| 2011/0106616 A1* | 5/2011 | Bigby et al. ............... 705/14.49 |

OTHER PUBLICATIONS

Demangeot, Catherine; Broderick, Amanda J, Conceptualizing consumer behaviour in online shopping environments, International Journal of Retail & Distribution Management 35.11:878-894. Emerald Group, 2008 vol. 35, Issue: 11 (Year: 2007).*

* cited by examiner

*Primary Examiner* — Marilyn G Macasiano
(74) *Attorney, Agent, or Firm* — Garlick & Markison; Edward J. Marshall

(57) ABSTRACT

First information associated with a first anonymous user, which indicates activities related to interactions of the first user with a first website, is obtained using a cookie. Second information associated with a second anonymous user, which indicates activities related to interactions of the second user with a second website, is obtained using a cookie. The first information and the second information are correlated to determine commonalities between the first information and the second information. In response to identifying at least one commonality, the first user identifier is associated with the second user identifier, and the first information is aggregated with the second information, based on the association. The aggregated information is stored in a profile associated with a single user, who is classified based on the aggregated information. The user, who may still be anonymous, is provided content based on the aggregated information.

20 Claims, 10 Drawing Sheets

LINKING SEPARATE ANONYMOUS ACTIONS TO A COMMON USER

CROSS REFERENCE TO RELATED APPLICATIONS

The present U.S. Utility patent application claims priority pursuant to 35 U.S.C. § 120 as a continuation of U.S. Utility application Ser. No. 12/949,600, entitled "SYSTEM AND METHOD FOR PROFILING LISTENERS TO IMPROVE CONTENT DISTRIBUTION AND LISTENER RETENTION," filed Nov. 18, 2010, which claims priority pursuant to 35 U.S.C. § 119(e) to U.S. Provisional Application No. 61/262,517, entitled "SYSTEM AND METHOD FOR PROFILING LISTENERS TO IMPROVE CONTENT DISTRIBUTION AND LISTENER RETENTION," filed Nov. 18, 2009, both of which are hereby incorporated herein by reference in their entirety and made part of the present U.S. Utility Patent Application for all purposes.

FIELD

The present invention generally relates to data correlation, and more particularly to linking separate anonymous actions to a common user.

BACKGROUND

Currently listener data related to broadcast or streaming radio consist of disparate databases and loosely organized information. Such amorphous listener data limits its usefulness. Parties interested in using and applying the data are hindered in what they can accomplish. The lack of coherent listener data makes it difficult for media outlets to effectively promote themselves to the listeners because a complete and usable representation of a listener's preferences, reactions, demographics, psychographics, etc., is not available.

It would, therefore, be desirable to devise more coherent method of listener data gathering to enable the development of improved content distribution and advertising or promotional campaigns.

SUMMARY

The foregoing objects are achieved in a method of gathering listener data generally comprising obtaining first behavioral information from a single user when the user visits a first website or mobile device and assigning a first user identifier to the single user, obtaining second behavioral information from the single user when the user visits a second website or mobile device that provides a different product from the first website and assigning a second user identifier to the user, correlating the first behavioral information and the second behavioral information to determine that the first behavioral information and the second behavioral information are that of the single user, associating the first user identifier with the second user identifier, and associating the first behavioral information with the second behavioral information. The method may use a device identifier to identify a user device that accesses a streaming media site, and store information associated with the media site and the behavior of the user. Credits can be assigned to the user based on the user's behavior, and promotions made available to the user based on the user's behavior. The credits can then be accepted as tender for one or more of the promotions.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
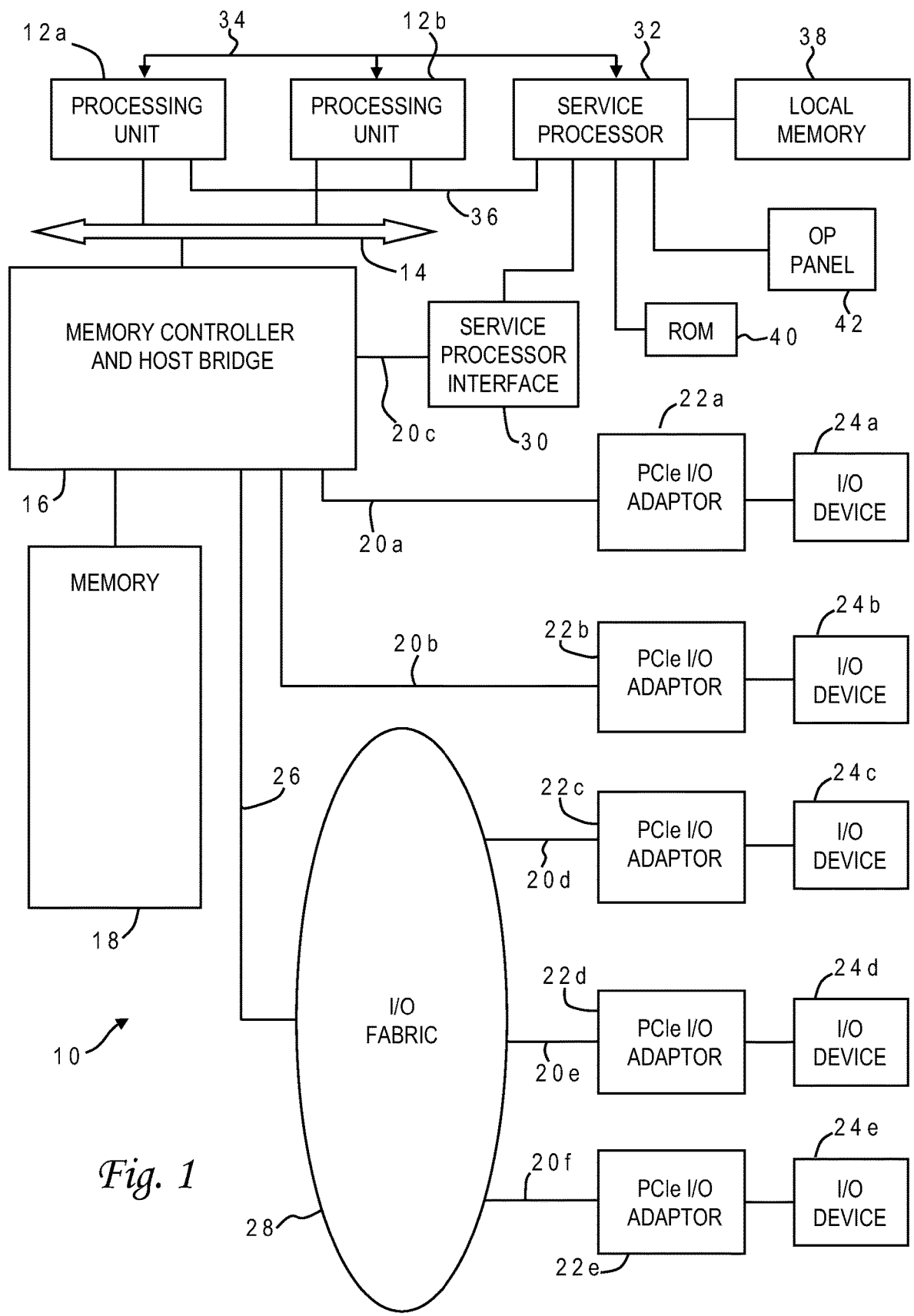
FIG. 1 is a block diagram of a computer system programmed to carry out listener profiling and content distribution in accordance with one implementation of the present invention.

With reference now to the figures, and in particular with reference to FIG. 1, there is depicted one embodiment 10 of a computer system in which the present invention may be implemented to carry out listener profiling for improved content distribution. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second level (L2) or third level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, headphones, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12*a*, 12*b* may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component, but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12*a*, 12*b* and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing, then computer system 10 is allowed to proceed. Executable code is loaded into memory 18 and service processor 32 releases host processors 12*a*, 12*b* for execution of the program code, e.g., an operating system (OS) which is used to launch applications and in particular the listener profiling and content distribution application of the present invention, results of which may be stored in a hard disk drive of the system (an I/O device 24) or on other storage media. While host processors 12*a*, 12*b* are executing program code, service processor 32 may enter a mode of monitoring and reporting any operating parameters or errors, such as the cooling fan speed and operation, thermal sensors, power supply regulators, and recoverable and nonrecoverable errors reported by any of processors 12*a*, 12*b*, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a novel listener profiling and content distribution system to improve listener retention. Accordingly, a program embodying the invention may include conventional aspects of various audience analysis tools, and these details will become apparent to those skilled in the art upon reference to this disclosure.

Figure 2:
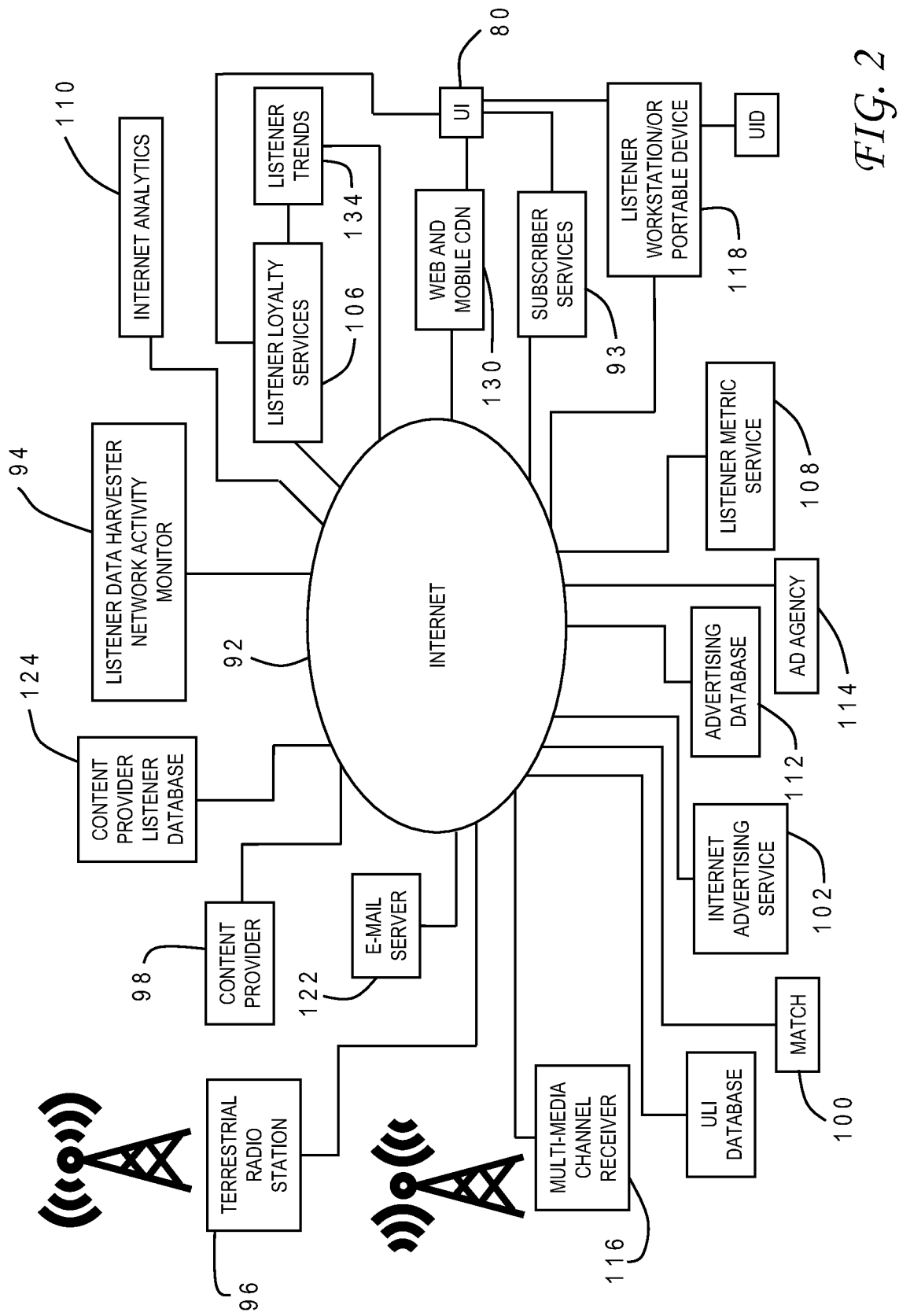
FIG. 2 is a block diagram for an exemplary implementation of a listener profiling and content distribution system constructed in accordance with the present invention, illustrating various entities interconnected via the Internet.

Referring to FIG. 2 a block diagram illustrates one example of a listener profiling and content distribution system having various internet based entities OBEs), including data harvesters, internet analytics, loyalty programs, content distribution networks, subscriber systems, metric services, ad agencies, internet advertising services, and other similar IBE's (represented by companies such as Clear Channel Radio Digital (CCRD) or Clear Channel Online Music & Radio (CCOMR), Double Click, Omniture, Enticent, Ando Media, Limelight, Microsoft, and similar), listener identifying entities, associated databases for storing listener and activity metadata, media outlets, and functional workstations for users/listeners who connect to content providers (such as CCRD) via the Internet.

In some embodiments a content provider such as content provider 98 can acquire data about its clients or listeners and store the data in listener database 124. Content provider 98 can use the data in the listener database 124 to profile listeners and the public to better understand and engage actual and potential listeners, audience, clients or the public generally. A profiling system can include a user device or user interface (UI) 80, to accept user data and servers and workstations to carry out anyone of a number of functions relating to manipulating the user data, the distribution of content and advertising and the acquisition, analysis of audience consumption related data. The user device 80 (or user) can be assigned one or more listener identifiers (IDs). Each listener can have one unique listener ID that can be utilized to coordinate listener data from various sources at various locations by associating the listener identifiers. The IDs can be detected by a network activity monitor 94 and all of the IDs can use the unified listener identifier (ULID) system 116 to link the user IDs to a single ULID. User IDs can be cookies of a user, data input by the user, media access control (MAC) addresses, and the like that can be associated with user input, activity, preferences, etc. The illustrated system can assign and retain one or more cross-domain unique and anonymous listener ID via one or more cookies or other data or metadata that can be used for tracking a listener's online activity and general listening and purchasing activities. The ID and the activity can be stored in listener profile databases as updated by monitoring entities such as data harvester 94. The data in the listener database can be used to group users and create user profiles for purpose of collecting additional listener data and for tailoring content (advertising and non-advertising) for consumption by the listener.

Content provider 98 can provide audio and visual content (advertising and non) via data streams to radio station websites via a Content Delivery Network (CDN) 130. Such a CDN and can be provided by Akamai and Limelight. CDNs 130 can manage internet radio streams and websites for internet radio portals such as Clear Channel iHeartRadio. CDN can also provide streams to other types of receivers, hardware and applications 118 including mobile hardware and applications via subscriber networks such as providers Research in Motion, Sprint, Verizon, and other similar subscriber and non-subscriber services 93. The CDNs can provide streaming services for content provider in many formats such as a Flash media file format or similar according to Intermediary and user requirements.

Internet advertising services, ad agencies, ad management entities, ad service providers, listener appreciation and loyalty programs, and internet analytics can all control ad server 102 to produce content. Ad server 102 can provide services that are sold primarily to advertising agencies 114, media companies and publishers to allow clients to traffic, target, deliver, and report on the success of their interactive advertising campaigns. Ad server 102 can automate the ad process for advertisers and can provide or perform targeted ads upon request in near real time. In some embodiments ad server 102 can consolidate processes and efforts required to facilitate an advertiser's ad buying cycle. Ad server 102 can facilitate the performance of ad related services and the management of ad inventory for publishers and advertisers. Ad server 102 can increase the purchasing efficiency of advertisers and minimize unsold inventory for publishers.

Although many of the blocks in FIG. 2 are illustrated as a standalone process or application, the actual product can operate on many operating systems and platforms thorough the system and network illustrated in FIG. 2. Ad server 102 can retrieve ads from ad database 112 and can provide ads to content provider 98 based on user metrics and parameters that are acquired by content provider 98. Ad server 102 can react in real time to the real time acquisition of user data and can supplement such real-time user data with data stored in content provider's listener database 124. The ads can be stored in ad database 112 and can be organized according to metadata that indicates that best application of the ad, parameters of the target for the ad such as sex, age, demographics, social class, etc. Ad server 102 can retrieve advertisements from advertising database 112 in real time and provide ads to a listener station 118 or subscriber devices 93 in real time (or within seconds) based on numerous rules-based criteria.

For example, in real time or near real time, listener metrics service 108, internet analytics 110 and listener loyalty service can direct ad server 102 to communicate with listener database 124, customer points database 106, listener metrics service 108, internet analytics provider 110 and uniform listener identifier database 116 to create and deliver a question, an offer, a promotion, a targeted ad, a coupon etc. and acquire a listener reaction or response. Such a multi-function offering allows content provider 98 to learn more about its clients or media consumers.

Data harvester 94 can acquire data being exchanged over the Internet 92 and Internet analytics provider 110 can refine and analyze the data to provide information useful to content provider 98 regarding listener habits and activities, the number of and success of targeted ads, listener reaction including listener communications such as replies to surveys, and creation of and success of incentive based programs for listeners (such as a customer points program 106). Thus, internet analytics provider 110 can provide feedback to advertisers including data on adverting reach and success for a particular campaign. The data can include listener reactions to a particular ad or content, the creation of consumer profiles and common reactions to ads and content for a particular profile. The data can be used to create and acquire consumer parameters, listener profiles, listener habits etc. Such content and reactions can be classified and analyzed based on music, news content, ad format, type of graphics, composition tempo, artists, time of day, demographics, what phenomena occurs prior to a listener changing streams, etc.

Thus, internet analytics provider 110 can analyze listener data by analyzing Internet traffic data, streams served, time spent listening, browsing habits, purchasing data such as the purchase of content downloads, listener actions such as tune in tune out bum out, listen time, listener habits/selections, time based listener trends, listener preference, listener satisfaction, content or purchases or just user activities, link selection, listener subscriptions, listener downloads and any other relevant feedback. Content provider 98 can use the listener data to improve ad response and listenership possibly through adding and/or modifying programming via playlists, play list rules and/or advertising rules. Internet analytics provider 110 can also act as a marketing agent or/and provide functions such as described with respect to internet ad service 102 and can provide listener targeting for content and ads and determine what elements of content generation and a content delivery system will increase listener engagement, music discovery, and other metrics and provide such information to content provider 98.

Listener loyalty service 106 can facilitate listener loyalty programs by providing data, points or tokens to listeners for time spent listening, a number of times and how long the listener was connected to a site or a stream, for interactive and non-interactive feedback or communication. Such a program can be provided by and controlled by content provider 98. CDNs 130 and/or data harvester 94 can detect listeners who are connected, and metrics associated with their activities and can provide this information to listener loyalty services 106 and content provider 98.

Subscriber services 93 can acquire and manage listener subscriptions and can offer the services disclosed with regard to listener data acquisition, processing and any change in activity that is based on such data processing. Subscription service 93 can provide listener data to content provider 98 and content provider can use the data to improve its mobile offing. Subscriber services can provide interactive campaigns, such surveys or listener programs through Short Message Service (SMS), Mobile Web/WAP ("Wireless Application Protocol"), or a similar communication format and can provide mobile advertising and efficiently connect brands with audiences with the assistance of content provider 98. Subscription services 93 can access advertising database 112, listener database 124, metric service 108, loyalty programs 106 and various other services or application to acquire and deliver appropriate and preferred ads to improve ad efficiency.

E-mails server 122 can be utilized by most, if not all any of the applications and services illustrated (IBES) in FIG. 2. For example, E-mail server can be utilized by content provider to acquire listener data and to send target e-mails to listeners to gather various types of listener data from all over the world. All IBEs can utilize such an interactive communication to provide content, get reactions and thus acquire data. Data harvester 94 can monitor and acquire data related to contests and surveys via the e-mail server 122. These communications can originate from a content provider such as streaming radio station. Resultant data from these communications can be gathered, aggregated, analyzed, and utilized by internet analytics service 110 for the content provider 98. The data harvester 94 can utilize an anonymous user ID "cookie" as tracked by the CDN 106 and the aggregated cookie data can be compiled using the ULID database 116 such that data associated with multiple identifiers can all be linked to a single user, a group of users, a household etc.

The disclosed arrangements can acquire listener data including point to point feedback and can provide listener loyalty or retention mechanisms related to a particular show, audio stream, or terrestrial broadcast using the IBE's disclosed. Listener trend service can acquire and use data that explains and predicts trends in listener behavior. Audience data harvester 94 can be any service such as Arbitron, Nielsen, Omniture, Enticent or Media Monitors that provides any type of audience data such as rating, rankings, profiling, and listener data. Content provider can also associate the listener data with polling results, audience reaction, etc. and can further include data such as listener reaction, song popularity and artist popularity, and advertising content and processes can be modified in response to listener reaction. Listener data can be associated with the content data information and listener data may be utilized by content provider 98 to conduct business opportunity modeling that can suggest business opportunities to radio stations, advertisers, ISPs and entities in the entertainment industry.

In some embodiments, content providers 98 use of the data in the listener database 124 can be utilized to conduct business opportunity modeling that analyzes the listener data as it applies to specific content such as ads and songs and suggest profitable strategies for a particular station or stream based on listener data such as listener retention data. For example, if a specific talk show host or recording artist has a large following then content provider 98 can obtain such information and predict whether a relationship with the host or artist or what kind of business arrangement should be profitable. Likewise, content provider 98 may provide an advertiser with a business case where the cost of an endorsement, or a royalty arrangement from an endorsement is known or can be estimated and based on the listener data and the popularity of talent. Using listener data and the processing thereof, content provider 98 can provide an advertiser with an estimate of how many audience reactions can be achieved with a particular content and thus estimate what the cost per successful listener impression will be for a contemplated ad. Content provider 98 can also use listener data to provide an advertiser with the cost value trade off when using a particular format, content or artist in a particular way. Using listener data content provider can review listener data in the databases and based on weightings, rules and/or artificial intelligence routines can suggest successful changes to websites, playlists and advertising content.

Content provider 98 can provide a unified registration and log-in process for all listener interface systems, UI 80 on all platforms that will accept or acquire user input. As stated above, a listener profile can be a multi-level profile, registering member across all platforms with different IDs all being associated in one way or another with a master ID. For example, sign-up/log-in to a website can track a user on a page they were are interacting with any of the IBEs. An administration tool can be used by content provider 98 to allow management of listeners/members, management and processing of listener data and the viewing of listener data such as listener demographics.

In some embodiments content provider 98 can acquire and collect listener data in parts using single-sign-on (SSO) database as central repository. Data can be collected via the e-mail server having an engine, via a contesting engine, and via a national overlay which can manage e-mail based on opt-in and report accordingly.

Content provider 98 can also integrate its processes with a subscription service 93 by leveraging single-sign-on parameters to integrate content providers listener data acquisition and storage with subscription services 93. Such a service 93 can be optimized by centralizing the process into a hub subscription management system (not shown). The listener data and its results can be migrated to a single subscription services provider 93, or to multiple providers 93 using a common interface. Content provided using the listener database and interacting with the subscription service provider can facilitate creation and economize various trials, subscription lengths, and bundles according to the listener data. A listener can access content providers' networks from multiple entry points, such as internet devices, mobile communication devices, etc., and the subscription service 93 can provide the listener with pricing flexibility, a tailored, possibly unique or single customer care center and can provide analysis tools. Content provider 98 can acquire and retain listener/consumer data acquired by the subscription service 93 and add such data to the listener database as part of the listener profile. It is envisioned that the data acquisition process will be flexible to accommodate future business models, technologies and devices.

Figure 3A:
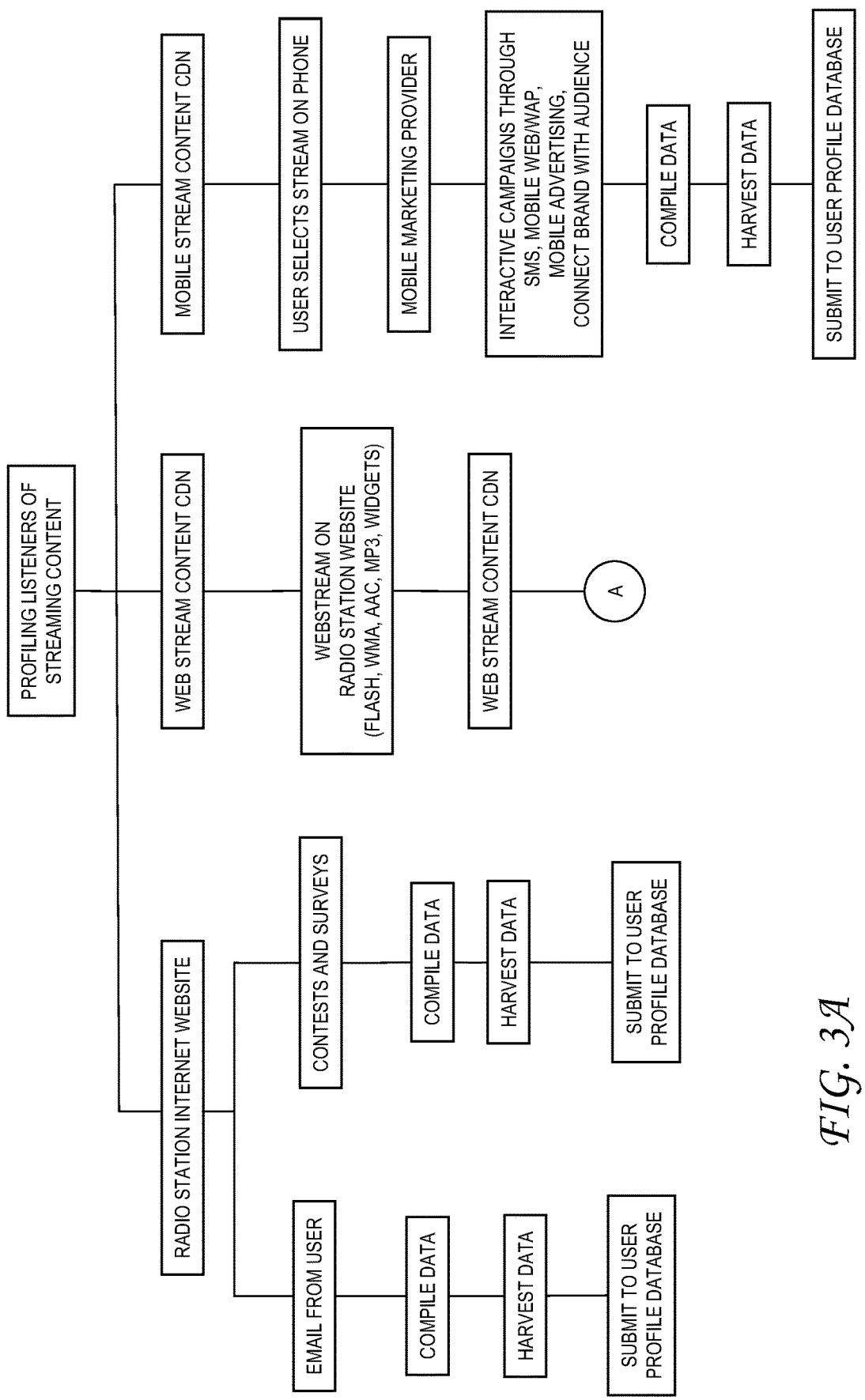
FIGS. 3A-3B are block diagrams depicting a system and method for using listener profiling data to distribute and promote goods and services in accordance with one embodiment of the present invention.
Figure 3B:
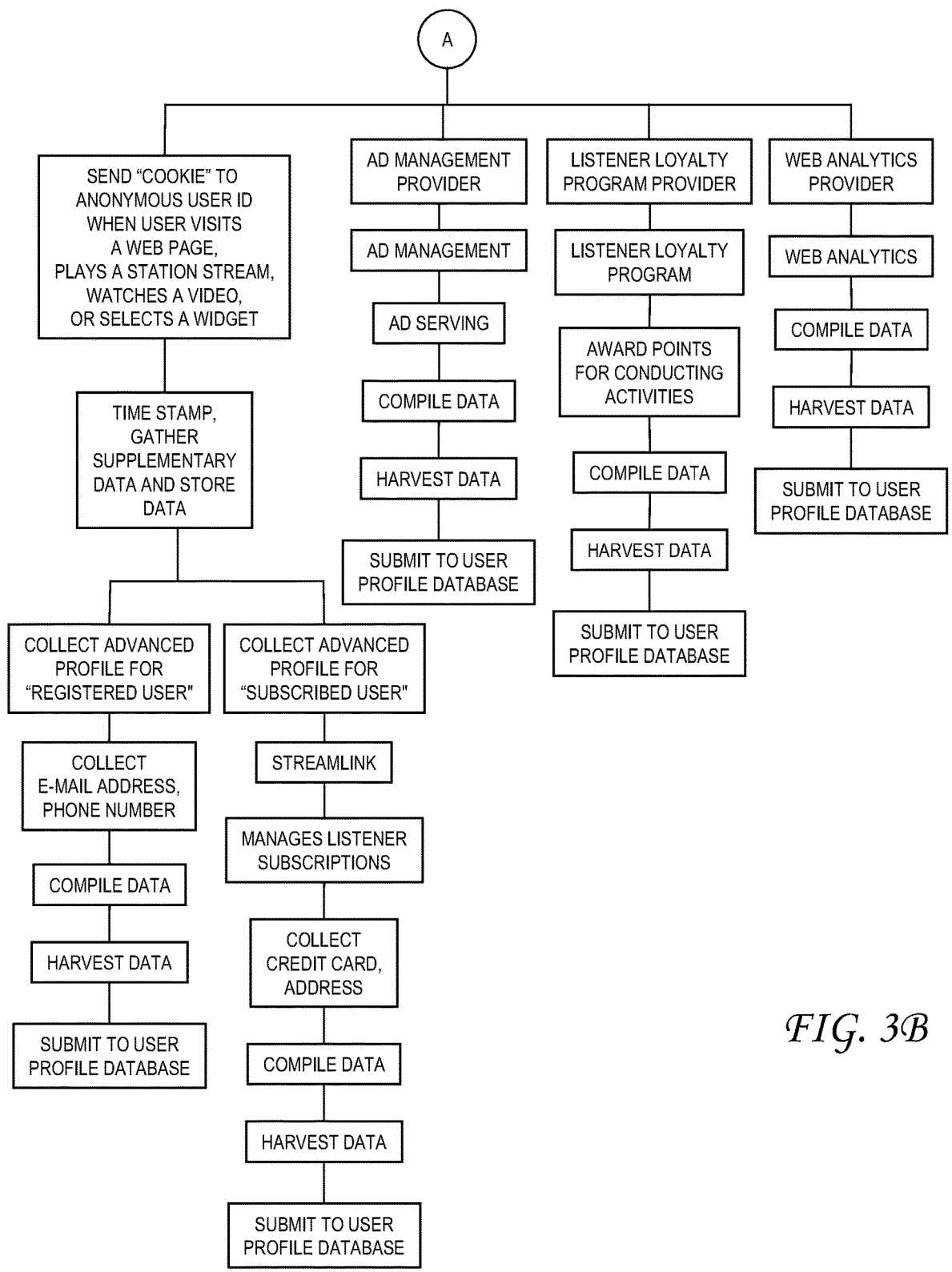
Figure 4A:
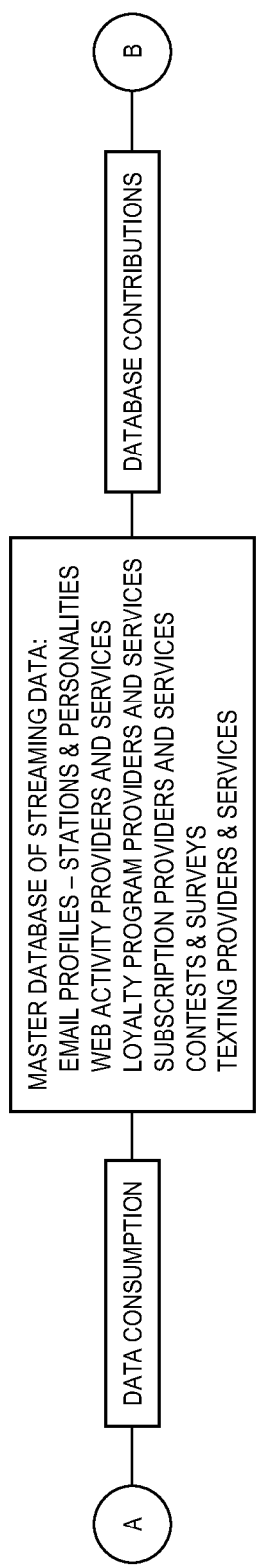
FIGS. 4A-4D are charts mapping an organization of a database for profiling-based promotion activities in accordance with one embodiment of the present invention.
Figure 4B:
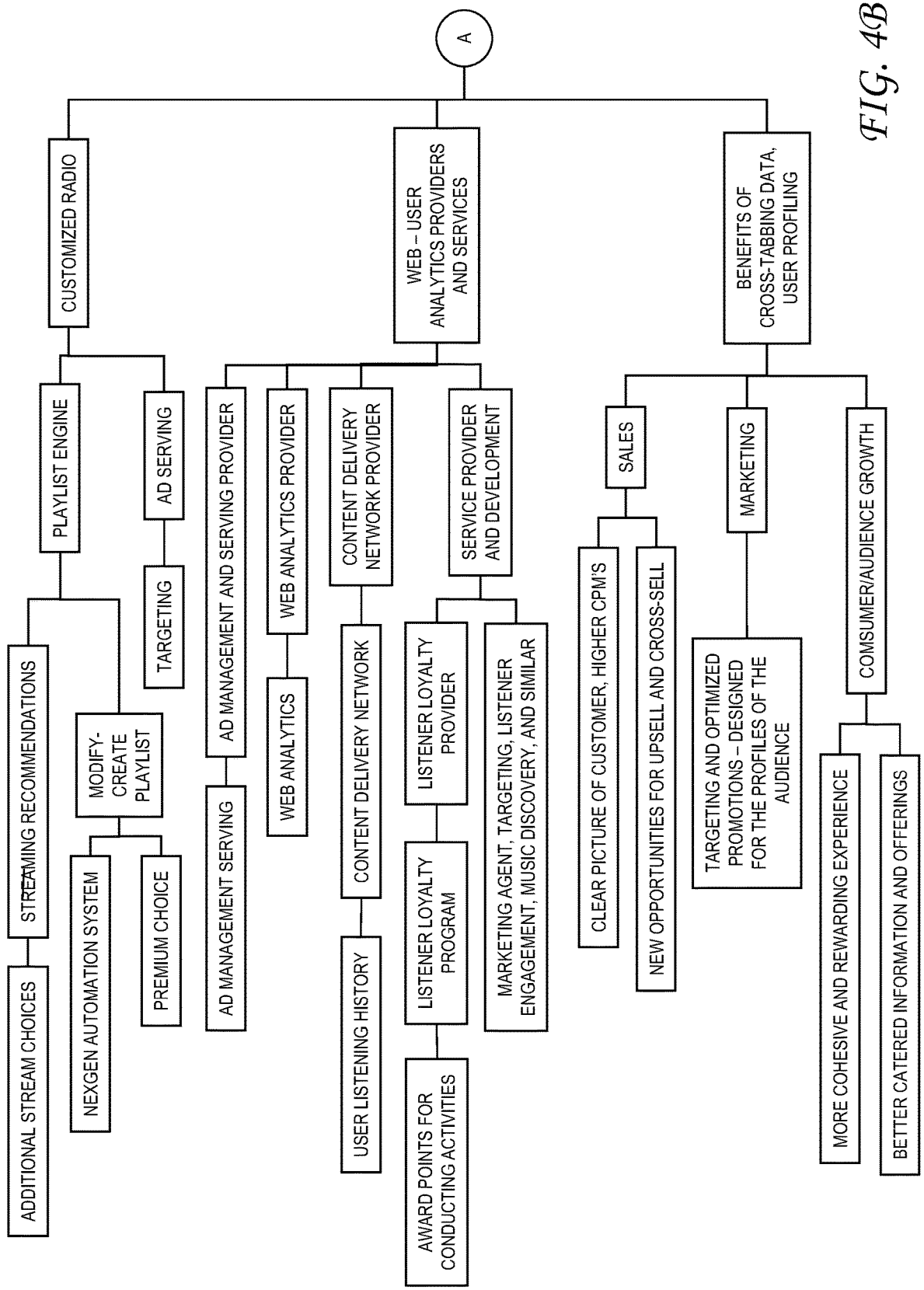
Figure 4C:
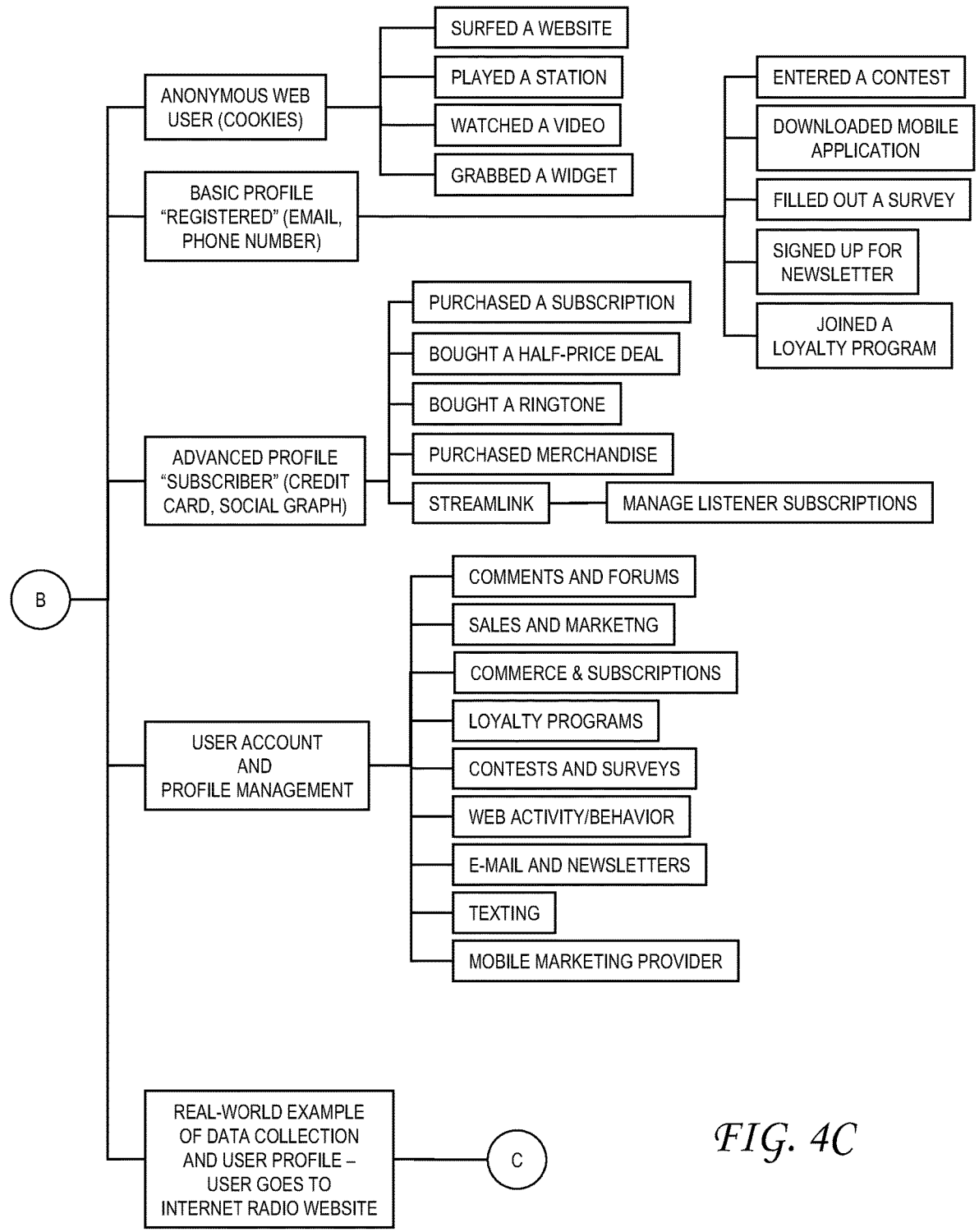
Figure 4D:
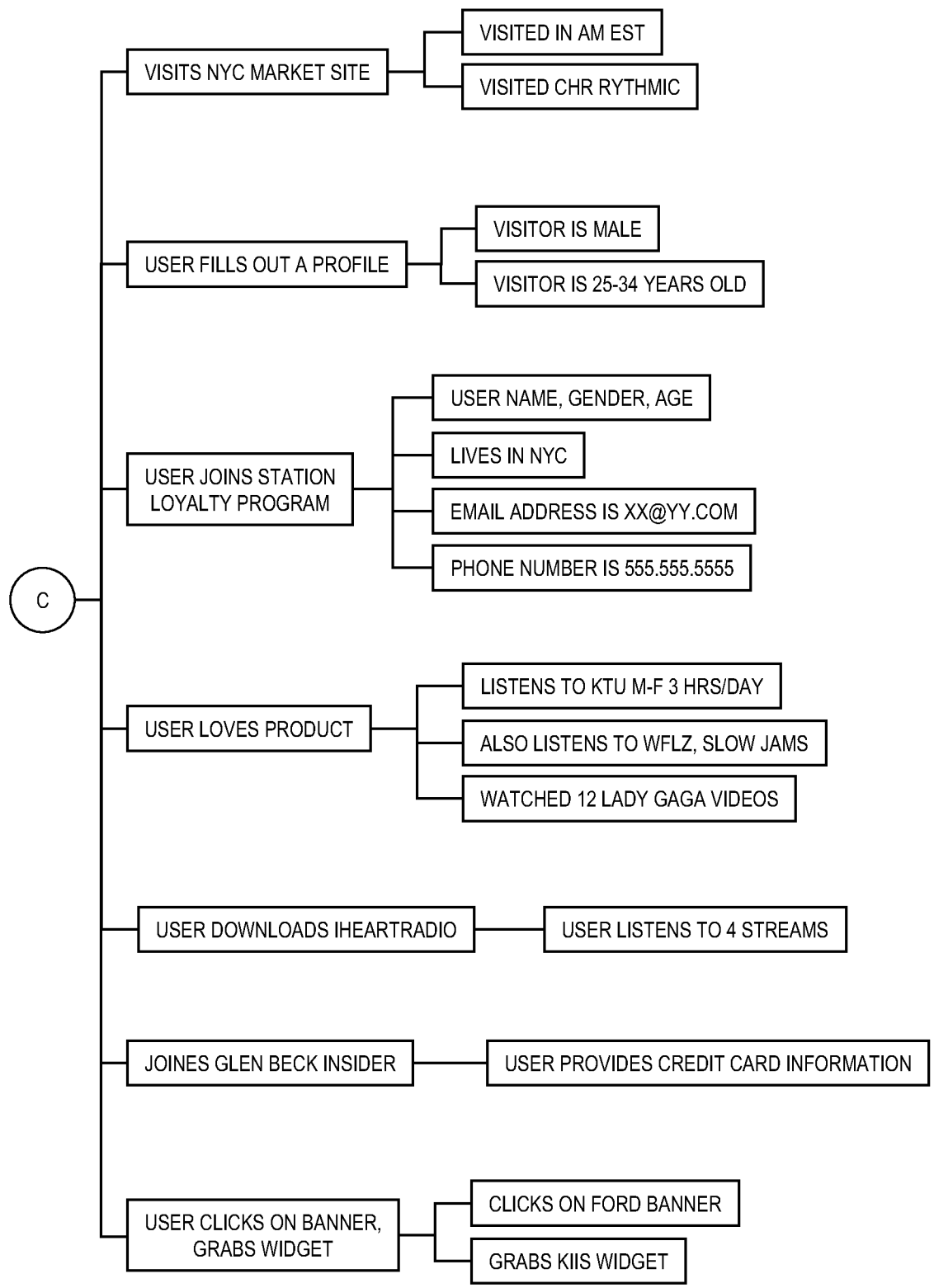

Content provider 98 can integrate listener loyalty ratings into a user profile, where a listener can have a different loyalty rating to multiple formats or a variety of content. The loyalty ratings can be integrated into all IBEs. The system also has survey capabilities and the ability to target surveys to listeners that will provide the most benefit. Content provider 98 can set up and collect data regarding listener age, sex, social class, and preferences. One embodiment of a listener profiling system is seen in FIGS. 3A-3B. According to this example, profiling listeners of streaming content may include profiling features of a radio station internet website, profiling features of web stream content via CDN, and profiling features of mobile stream content via CDN.

Content provider 98 can also use the listener data base to facilitate behavioral tracking of listeners. As described above, tracking can use one or more unique identifiers using identifiers in multiple activities by inserting the identifiers into cookies, or similar storage vehicles. The listener data base can be appended, or a listener profile can be expanded, as the listener participates in, or opts-in to more services or more tagged listener data is acquired. Accordingly, content providers can create profiles for individual listeners and store the profiles and listener data, and then use the data in multiple steps of the overall advertising process.

The content provider 98 can be a radio station with a website. The interaction between listener loyalty services 106 and content provider 98 allows for the content provider 98 via a radio station website to interact with a listener. Based on displaying activities and points associated with activities a user can interact with the website and a listener profile can be built from such an interaction. After a user activity that radio website can send a listener identifier, an activity identifier that identifies the activity that the listener has satisfactorily performed, a point value associated with the activity, and a description of the activity to the listener loyalty services provider 106. The listener loyalty service can provide act as a clearing house or data warehouse and can accumulate points for each listener. The listeners can also use the listener loyalty service to redeem points for prizes.

Thus, the credit points can be awarded for activity by a listener that occur external to the listener loyalty service 106 or its website. Multiple activity codes are acknowledged by the listener loyalty service 106 and such codes can be set up by the content provider. Each activity code can have a default description and default point value, which can be overwritten with each posting or recording of an activity by the listener loyalty service 106. The description of an activity can be an explanation of the action taken by the member, and the point value can be calculated by functions such as an exponential number of points awarded for an increase in time or a simple multiplier. The loyalty service can report back to the content provider website 98 in real time so a listener can have up to the minute information regarding how many points the listener has and how many points can be earned by taking the action. The activity description and point value can show up in the member's activity history screen on the rewards site to enable members to see what they were credited for in real time. Each activity code can also be set up with specific limits. The limits can control how frequently a member can earn points for a specific activity (e.g. once in a lifetime, once a month, once per week, once per day). IP Address of server accessing the posting acceptor of the listener loyalty service provider 106 can be stored to only allow authorized access to the service. Listener profiles can be expanded as the system acquires data and ads can be tailored to the listener based on the listener's profile. FIGS. 4A-4D illustrate an extended chart mapping an organization of a database for profiling-based promotion activities in accordance with one embodiment of the present invention. In this example the database elements are partitioned into data consumption elements and database contribution elements.

In some embodiments the system can be implemented as a central server computer where the computer can use device identifiers to facilitate the mining of user behavioral information and the use of such information to select and then deliver content to the device. Thus, the system can operate without gathering or storing any personal possibly confidential information. However, the data harvester 94 might use names etc. to associate different devices that a single user utilizes to communicate with websites. Data harvester 94 can use a device identifier to identify a device used to accesses a streaming media site and can store information associated with the media site. Data harvester 94 can monitor and store information associated with behaviors of a user of the user device. The data might indicate a general or specific user behavior, action, or result of such action, for example what content the user is listening to, what websites the user visits, and what activities, interactions or behavior the user exhibits while at each site.

In some embodiments, the media site can assign credits to the user or the user's device and can make promotions available to the user based on the user's behavior. The media site can then accept the credits as tender for one or more of the promotions. In some embodiments one or more listener classifications can be assigned to the user based on the stored behavior information. The media site can select content from a pool of content to be sent to the user based on the classifications that are assigned to the listener.

The data harvester 94 can gather data pertaining to an individual's listening behavior by obtaining a first set of behavioral data from activities of the user when the user visits a website via a first device, for example a desktop computer. When the user visits a second website possibly through a second device for example a smart phone, data harvester 94 can assign a different user identifier to the user.

In some embodiments, the second website visited can provide a different product or service than the first website. The data harvester 94 can correlate the first behavioral information with the second behavioral information to determine that the first behavioral information and the second behavioral information are that of the single user. The data can be associated based on common data such as a name username password, address date of birth, age sex, screen name, etc. Based on the quality of the match the association can be rated. When the system can find commonality, as the data harvester 94 can associate the first user identifier with the second user identifier and place the data in a single database or relate entries in a database, the first and second behavioral information can be merged.

In some embodiments, the user or user device can be classified by assigning the user with one of more listener profile classifications to the user or user ID based on the merged behavioral information. The user might be assigned a ranking or a weight as to each classification where, the user might be assigned a 10 on a scale of 1 to 10 to the classification of female if the system has strong evidence that the user is female where the user might be assigned a 5 to the classification of income if the system can imply but the system 100 has no hard evidence that the user is in a particular income bracket.

The advertising service provider 102 can use the listener profile classification to selecting content, such as an advertisement from a pool of advertisements based on the listener's classifications and their applicability. In some embodiments a network-based advertisement placement service provider can provide such a selection process based on extensive metadata.

Figure 5:
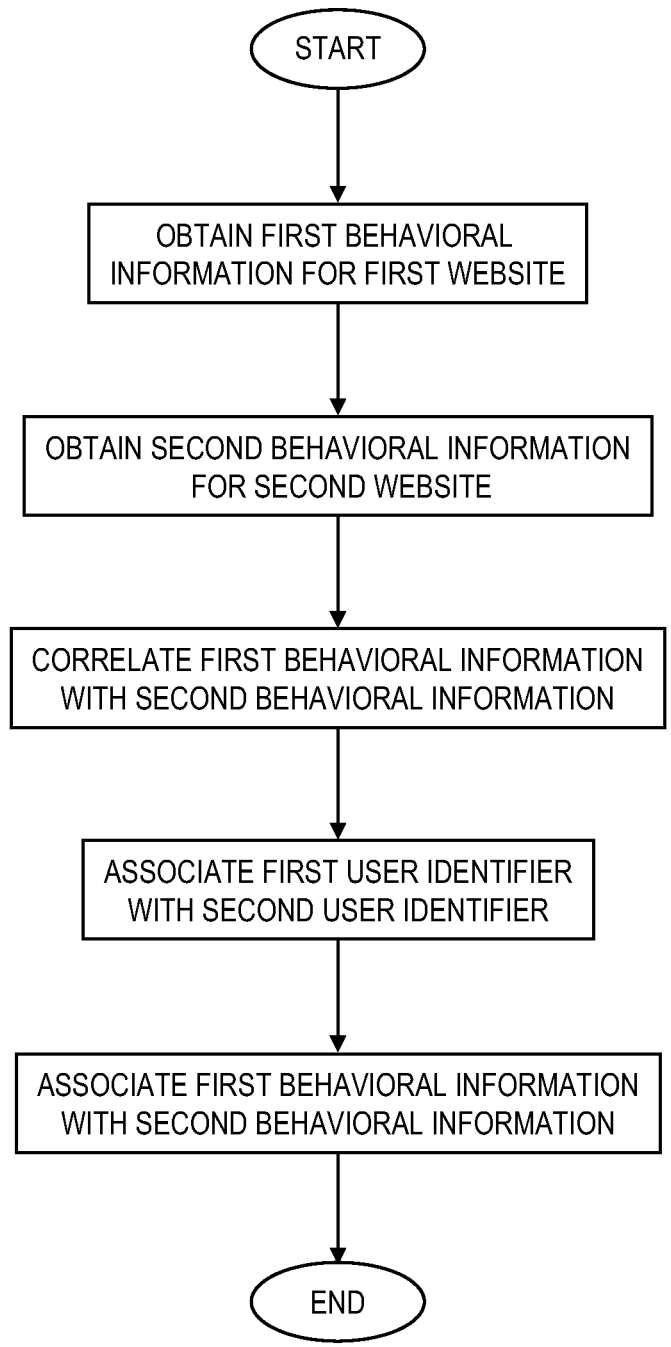
FIG. 5 is a chart illustrating the logical flow for a user behavior correlation process in accordance with one implementation of the present invention.
Figure 6:
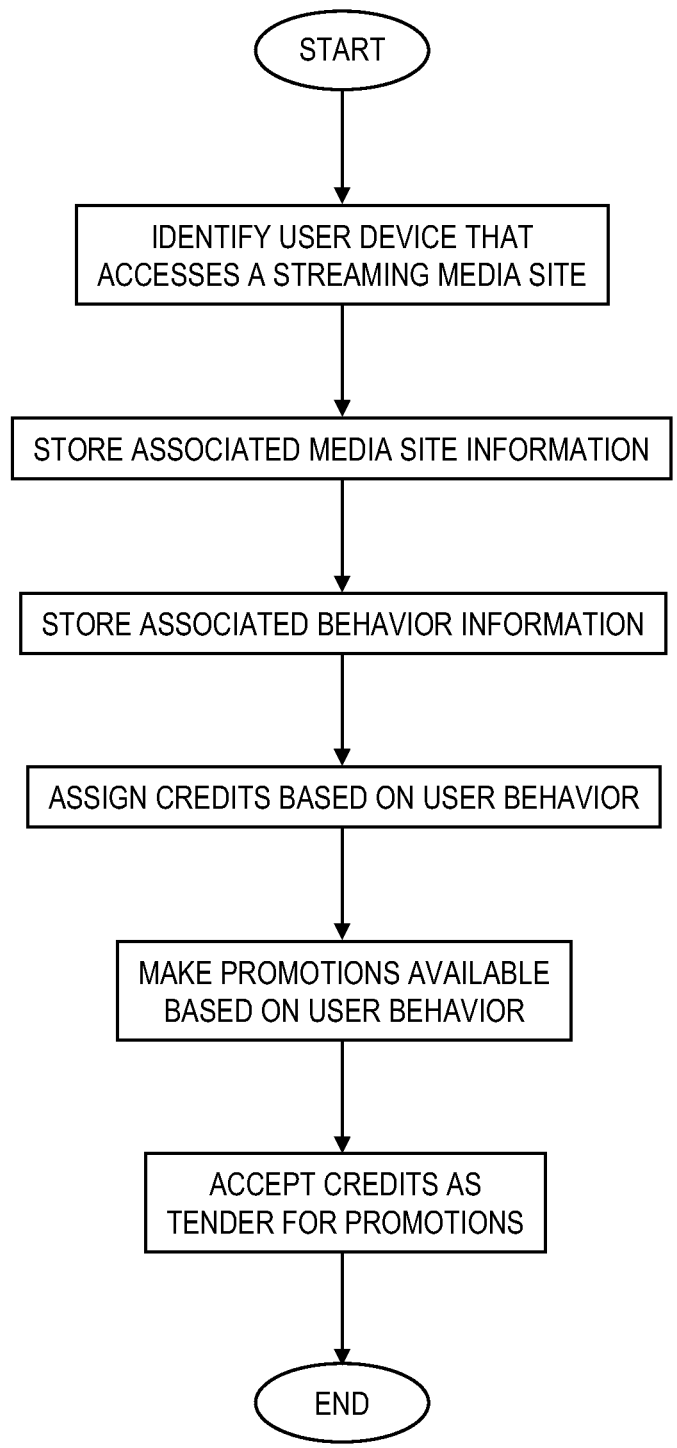
FIG. 6 is a chart illustrating the logical flow for a promotion redemption process in accordance with one implementation of the present invention.

In some embodiments, the promotions server, the loyalty service 106 or the content server 98 can select content from a pool of content for a particular user based on the merged data. After the content is selected it can be sent or transmitted to one of the devices that are associated with the user such as a smart phone of a desktop computer or a receiver mounted in the dash of an automobile. The selection and transmission of the content can be performed in real time or near real time where when the system determines that the user is on-line, connected to, or in communication with a particular site, such as a streaming media site. Charts illustrating logical flows for generalized processes in accordance with certain implementations of present invention are further illustrated in FIGS. 5 and 6.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method comprising:
    obtaining a first cookie from a first device via a communications network, wherein the first cookie includes a first identifier corresponding to a first anonymous user identifier stored in a database, and wherein the first anonymous user identifier is associated with first information stored in the database, the first information indicating activities related to interactions of a first anonymous user with a first website;
    obtaining a second cookie from a second device via the communications network, wherein the second cookie includes a second identifier corresponding to a second anonymous user identifier stored in the database, and wherein the second anonymous user identifier is associated with second information stored in the database, the second information indicating activities related to interactions of a second anonymous user with a second website;
    correlating the first information and the second information to determine commonalities between the first information and the second information;
    in response to identifying at least one commonality of the commonalities:
        determining that the first anonymous user and the second anonymous user are a single user based on the at least one commonality; and
        automatically updating the database to include a single unified listener identifier (ULID) associating the first information with the second information by linking the first anonymous user identifier with the second anonymous user identifier, wherein the single ULID identifies the single user.

2. The method of claim 1, further comprising:
    associating, in the database, one or more listener profile classifications to the single user based on the first information and the second information.

3. The method of claim 2, further comprising:
    selecting content from a pool of content based on the one or more listener profile classifications; and
    transmitting the content to a device associated with the single user.

4. The method of claim 3, wherein at least one of the selecting or the transmitting is performed by a web-based advertisement placement service provider.

5. The method of claim 3, wherein the device is a smart phone.

6. The method of claim 2, further comprising:
    transmitting the one or more listener profile classifications to a content selection service.

7. The method of claim 1, wherein:
    the first information includes a device identifier; and
    the at least one commonality between the first information and the second information includes the device identifier.

8. A computer system, comprising:
    one or more processors configured to process program instructions;
    a memory device connected to said one or more processors; and
    program instructions residing in said memory device, said program instructions configured to implement a method including:

obtaining a first cookie from a first device via a communications network, wherein the first cookie includes a first identifier corresponding to a first anonymous user identifier stored in a database, and wherein the first anonymous user identifier is associated with first information stored in the database, the first information indicating activities related to interactions of a first anonymous user with a first website;

obtaining a second cookie from a second device via the communications network, wherein the second cookie includes a second identifier corresponding to a second anonymous user identifier stored in the database, and wherein the second anonymous user identifier is associated with second information stored in the database, the second information indicating activities related to interactions of a second anonymous user with a second website;

correlating the first information and the second information to determine commonalities between the first information and the second information;

in response to identifying at least one commonality of the commonalities:
   determining that the first anonymous user and the second anonymous user are a single user based on the at least one commonality; and
   automatically updating the database to include a single unified listener identifier (ULID) associating the first information with the second information by linking the first anonymous user identifier with the second anonymous user identifier, wherein the single ULID identifies the single user.

9. The computer system of claim 8, wherein the method further includes:
   associating, in the database, one or more listener profile classifications to the single user based on the first information and the second information.

10. The computer system of claim 9, wherein the method further includes:
   selecting content from a pool of content based on the one or more listener profile classifications; and
   transmitting the content to a device associated with the single user.

11. The computer system of claim 10, wherein at least one of the selecting or the transmitting is performed by a web-based advertisement placement service provider.

12. The computer system of claim 10, wherein the device is a smart phone.

13. The computer system of claim 9, wherein the method further includes:
   transmitting the one or more listener profile classifications to a content selection service.

14. The computer system of claim 8, wherein:
   the first information includes a device identifier; and
   the at least one commonality between the first information and the second information includes the device identifier.

15. A computer program product comprising:
   a non-transitory computer-readable storage medium tangibly embodying a program of instructions configured to implement a method including:
      obtaining a first cookie from a first device via a communications network, wherein the first cookie includes a first identifier corresponding to a first anonymous user identifier stored in a database, and wherein the first anonymous user identifier is associated with first information stored in the database, the first information indicating activities related to interactions of a first anonymous user with a first website;
      obtaining a second cookie from a second device via the communications network, wherein the second cookie includes a second identifier corresponding to a second anonymous user identifier stored in the database, and wherein the second anonymous user identifier is associated with second information stored in the database, the second information indicating activities related to interactions of a second anonymous user with a second website;
      correlating the first information and the second information to determine commonalities between the first information and the second information;
      in response to identifying at least one commonality of the commonalities:
         determining that the first anonymous user and the second anonymous user are a single user based on the at least one commonality; and
         automatically updating the database to include a single unified listener identifier (ULID) associating the first information with the second information by linking the first anonymous user identifier with the second anonymous user identifier, wherein the single ULID identifies the single user.

16. The computer program product of claim 15, wherein the method further includes:
   associating, in the database, one or more listener profile classifications to the single user based on the first information and the second information.

17. The computer program product of claim 16, wherein the method further includes:
   selecting content from a pool of content based on the one or more listener profile classifications; and
   transmitting the content to a device associated with the single user.

18. The computer program product of claim 17, wherein at least one of the selecting or the transmitting is performed by a web-based advertisement placement service provider.

19. The computer program product of claim 17, wherein the device is a smart phone.

20. The computer program product of claim 16, wherein the method further includes:
   transmitting the one or more listener profile classifications to a content selection service.

* * * * *